United States Patent [19]
Banfield et al.

[11] Patent Number: 5,540,970
[45] Date of Patent: Jul. 30, 1996

[54] DIE CUT MOLD-IN

[75] Inventors: Donald L. Banfield, Hudson; Gerald F. Rocha; Martin I. Jacobs, both of Bedford; Randall B. Kenney, Concord, all of N.H.

[73] Assignee: Velcro Industries B.V., Curacao, Netherlands Antilles

[21] Appl. No.: 536,965

[22] Filed: Sep. 29, 1995

Related U.S. Application Data

[63] Continuation of Ser. No. 390,150, Feb. 21, 1995, abandoned, which is a continuation-in-part of Ser. No. 87,917, Jul. 6, 1993, abandoned, which is a continuation of Ser. No. 695,183, May 3, 1991, abandoned, and Ser. No. 976,485, Nov. 16, 1992, abandoned, which is a continuation of Ser. No. 695,183, May 3, 1991, abandoned.

[51] Int. Cl.$^6$ .................................................. A44B 21/00
[52] U.S. Cl. ......................... 428/100; 428/99; 428/120; 428/900; 24/306; 24/444
[58] Field of Search ........................... 428/99, 100, 120, 428/900; 24/306, 442, 444

[56] References Cited

U.S. PATENT DOCUMENTS

| | | | |
|---|---|---|---|
| 4,693,921 | 9/1987 | Billarant et al. | 428/100 |
| 4,710,414 | 12/1987 | Northrup et al. | 428/43 |
| 4,726,975 | 2/1988 | Hatch | 428/100 |
| 4,931,344 | 6/1990 | Ogawa et al. | 428/100 |
| 4,933,224 | 6/1990 | Hatch | 428/100 |
| 5,286,431 | 2/1994 | Banfield et al. | 264/134 |

FOREIGN PATENT DOCUMENTS

| | | | |
|---|---|---|---|
| 0246221 | 11/1987 | European Pat. Off. | A44B 18/00 |
| 0439969 | 8/1991 | European Pat. Off. | B29C 33/00 |
| 2047243 | 3/1971 | France | A44B 21/00 |
| 2405123 | 5/1979 | France | B29C 27/14 |
| WO92/19119 | 11/1992 | WIPO . | |

*Primary Examiner*—Alexander Thomas
*Attorney, Agent, or Firm*—Steven J. Weissburg

[57] ABSTRACT

A fastener of the hook and loop type intended to be incorporated into plastic articles by plastic molding processes is formed of a known separable fastener member having a base member and a plurality of engaging elements upstanding from one surface thereof. A vinyl plastisol, thermoplastic, or rubber encasement which intimately surrounds the individual engaging elements protects the elements when they are exposed to the harsh environment of a molding process. The fastener is placed in a mold and molded into, as an integral part thereof, a plastic part. The encasement is removable from the engaging elements after the molding process, to expose the engaging elements, without permanently deforming or substantially destroying the fastening performance thereof.

32 Claims, 10 Drawing Sheets

DIE CUT MOLD-IN

BACKGROUND OF THE INVENTION

This is a continuation of application Ser. No. 08/390,150 filed on Feb. 21, 1995, now abandoned, which is a continuation of application Ser. No. 08/087,917 filed on Jul. 6, 1993 now abandoned, and which designated the U.S., which is a continuation in part of application Ser. No. 07/695,183 filed on May 3, 1991 now abandoned, and application Ser. No. 07/976,485 filed on Nov. 16, 1992 now abandoned, which was a continuation application Ser. No. 07/695,183 filed on May 3, 1991 now abandoned.

This invention relates to an improved device and method for adapting separable fasteners, particularly those of the hook and loop type, for attachment to other objects such as poly(urethane) foam seat cushions or hard plastic parts for automobiles, furniture and the like. In this method one portion of a separable fastener is incorporated into the plastic object during the molding process for subsequent attachment to another object carrying the mating portion of the separable fastener. The fastener of this invention provides a greater degree of design flexibility as to the shape and especially as to types of plastic into which the part may be molded. Although particular reference is made herein to elastomeric poly(urethane) foam or hard plastic parts, it is to be understood that a fastener product as per this application can be used in parts made from a wide variety of materials, e.g. thermoplastic materials, thermosetting materials, elastomers, or any other moldable composition, and such compositions are referred to broadly as plastics.

DESCRIPTION OF THE PRIOR ART

Hook and loop separable fasteners, such as those sold by the assignee of this application under the trademark "VELCRO" are well known and used to join two members detachably to each other. This type fastener has two components. Each has a flexible substrate or base having one component of the fastening system on the surface thereof. One surface is typically comprised of resilient hooks while the other is comprised of loops. When the two surfaces are pressed together they interlock to form a releasable engagement.

The hooks can be of any of a variety of shapes, ranging from simple cane-shaped hooks, to palm tree-shaped hooks, to mushroom shaped hooks, all of which are well known within the art. As used within this application, the term "hook" shall be construed to cover any such configuration of loop-engaging element.

Separable fasteners have in recent years been used in the manufacture of automobile seats in the attachment of an upholstered seat cover, hereinafter called trim cover, to a poly(urethane) foam bun. One portion of the separable fastener is incorporated into the surface of the poly(urethane) seat bun during the foam molding process. The mating portion of the separable fastener is attached to the seat cover to provide releasable attachment to the foam seat bun. The separable fastener assembly used in the foam mold for incorporation in the bun surface typically comprises the hooked portion of the separable fastener system. This hook portion is characterized by a base carrying resilient hooks on one surface. The outer surface of the base may act as an anchoring surface by a variety of methods well known in the art. In some assemblies a magnetizable shim is attached to the base to facilitate placement of the assembly in a trough of the mold cavity wall, which is equipped with magnets. A protective layer, usually in the form of a thin plastic film, is placed over the resilient hooks to prevent incursion of foam into the hooks during the molding process. Significant foam contamination of the hooks would affect their ability to engage with the mating portion of the fastener. Such fastening devices are applied to one surface of a clamshell mold; a chemical mixture, usually of a diisocyanate and a polyol, are injected into a mold; the upper surface of the mold is closed and clamped shut while the chemicals react and blow to form a flexible foam, well known in the art. The present state of the art relating to the attachment of such fastener means to foamed seat cushions and the like is generally represented by French patents 2,405,123 and 2,423,666 as well as the following U.S. patents:

U.S. Pat. No. 4,470,857, issued Sep. 11, 1984 in the name of Stephen J. Casalou and assigned to R. A. Casalou, Inc.;

U.S. Pat. No. 4,563,380, issued Jan. 7, 1986 in the name of Philip D. Black and assigned to Minnesota Mining and Manufacturing Company;

U.S. Pat. No. 4,673,542, issued Jun. 16, 1987 in the name of Lauren R. Wigner and assigned to General Motors Corporation;

U.S. Pat. No. 4,693,921, issued Sep. 15, 1987 in the name of Patrick J. Billarant and Bruno Queval and assigned to Aplix;

U.S. Pat. No. 4,710,414, issued Dec. 1, 1987 in the name of Walter E. Northup and Maurice E. Freeman and assigned to Minnesota Mining and Manufacturing Company;

U.S. Pat. No. 4,726,975, issued Feb. 23, 1988 in the name of Richard N. Hatch and assigned to Actief N.V. ABN Trust Co.; and U.S. Pat. No. 4,842,916 issued Jun. 27, 1989 to Kunihiko Ogawa et al assigned to Kuraray Company Ltd., Kurashiki, Japan.

Such mold-in separable fastener assemblies presently in use, while proving to be superior means of attaching a seat cover to a foam bun, have limitations. One disadvantage of the separable fastener assemblies of the type disclosed in U.S. Pat. No. 4,673,542 is that the thin plastic film layer used to cover the hooks is light and flimsy thus limiting the degree of protection offered to the hooks against high pressure or temperature. Such devices are therefor unable to be used for molding hooks into hard plastic using a standard injection molding machine where the high temperature of the molten plastic has a tendency to melt the hooks or the high pressure of the plastic during the injection process is capable of crushing the hooks.

Other prior-art assemblies, including those disclosed in U.S. Pat. Nos. 4,726,975, 4,563,380 and 4,693,921 also employ a thin layer of film to prevent the incursion of foam into the fastener elements of the separable fastener during molding. French Patent 2,423,666 discloses a system for sealing the edges of the tape in the mold trough by jamming the edges of the fastener into the trough. None of these methods provides protection for the hooks against high temperature or pressure which will destroy hooks during the molding operation. U.S. Pat. No. 4,562,032 incorporates a soft lining as an integral portion of the mold cavity surface to protect the grain of a thin grained face of a vinyl sheet but the patent literature is generally devoid of teachings which protect large protuberances on plastic mold inserts from the rigors of the injection or compression molding process. In fact the patent literature repeatedly recommends the melting temperature of the insert part be greater than the processing temperature of the injecting molten polymer. Such teachings are contained in U.S. Pat. No. 2,643,158 directed to a method of molding brushes. At section 4, line 60–63, "In general the materials should be selected so that the strands or tufts shall not be caused to deteriorate by the molding heat". Those skilled in the art understand it is not advisable to insert plastic into injection molds or into compression molds at temperatures greater than the distortion temperature of the insert part. In some cases methods are used for cooling a portion of the mold containing a meltable insert. Such systems are cumbersome, expensive and difficult to use.

U.S. Pat. No. 2,293,035 describes a method of combining two molded parts of different colors into one article by molding the first mold piece into a removable metal insert that constitutes the first part mold and using the removable mold as the insert in the second mold without removing the first part from the insert mold. The method recommends molding the second part while the first part is still warm to achieve proper bond between the first and second parts. This method provides no special methods of protecting the part from pressure or temperature other than to retain it in its original mold. It has the disadvantage that the first mold is large and cumbersome because of the necessity of fitting and being retained securely into the first injection molding step.

SUMMARY OF THE PRESENT INVENTION

In the present invention there is provided a novel fastener capable of being insert molded into elastomeric foamed parts, such as seat buns, or into hard plastic parts such as cases, using standard injection or compression molding techniques without contaminating or destroying the hook projections due to intrusion of material onto the hooks or heat and pressure. As in the prior art products, the invention carries on one surface an area of outwardly extending fastener elements, preferably hooks. These fastening elements constitute one half of a touch fastening system. The other half of the fastening system is attached to the companion portion of the intended assembly. The outwardly extending fastener elements, however, are at least partially encased in an elastomeric compound, more specifically described below, which fills most (preferably all) of the void areas surrounding and protecting the engaging elements.

This novel fastener appears as a sheet like structure. In this form, it is possible to cut out strips or segments having complex shapes from the sheet which can be placed into a mold to be molded into a plastic part. According to one aspect of the invention, encasement of the engaging elements is total such that the surface of the encasement is completely void of protuberances. According to another aspect of the invention, encasement is not quite total, such that the top surfaces of the engaging elements are slightly exposed, as through "pinholes." Such exposure avoids formation of a vacuum seal around the engaging elements and makes it easier to remove the encasement after the fastener is molded into a part. The elastomeric encasement possess sufficient resistance to compression to protect the hooks against high pressures of the molding process and also provides insulation against transfer of heat from the molten injected plastic which could melt the hooks of the fastener.

A variety of materials may be used for the elastomeric encasement. Vinyl plastisol, preferably foamed, is preferred in certain circumstances. Various extruded thermoplastics may also be preferred, as may several types of rubber.

I have found it convenient to incorporate means for magnetic attraction within the elastomeric encasement for holding the fastener against the magnets incorporated into the walls of the mold as is well known in the art. Such materials as iron filings or iron oxide or carbon steel strips are suitable for such purposes. Alternatively, a steel shim may be incorporated in or affixed to the base member of the fastener or attached to the cover of the fastener.

This invention provides a fastener which is capable of withstanding the rigors of the most severe molding processes, such as injection or compression molding, at temperatures greater than the distortion temperature of the polymer forming the insert part. A fastener according to the invention is placed in a mold and positioned with the aid of the magnets. Material from which the molded product is to be fabricated is introduced into the mold, and the product is formed by molding. After molding, the elastomeric protective encasement is removed from the fastener elements thereby exposing the hooks. The protective encasement, being elastic, is capable of being removed by several means. In its simplest form removal is achieved by simply yanking or pulling upon the sheet formed by the elastomeric compound. The elastomeric sheet is of such integrity and elasticity it can be pulled away from the hooks without distorting them or without breaking itself. Other methods of removal are possible including injecting air through a needle inserted through the elastomeric protective encasement to lift the encasement off the engaging elements through pressure built up under the encasement. In any event the exposed hooks at this point form an integral part of the plastic piece.

The companion portion of the assembly, containing on its inner surface companion fastening elements (loops for example) is affixed to the plastic part by means of the incorporated mating elements. The hook and loop closure firmly holds the two components together providing a detachable means for combining the sections of the assemblage. The fastener of this invention is also usable in molding situations such as the cold molding of urethane seat buns.

Applying a vinyl plastisol encasement to a release blanket, then nipping the hooks into the vinyl plastisol, is a preferred method for producing the fastener component of the invention. Extruding a thermoplastic encasement into which the hooks are embedded may also be preferred at times. Furthermore, it can be convenient to apply the protective encasement to the fastener material in wide sheets using coating or calendering techniques well known in the art. It is then possible to slit the wide product into long narrow strips which substitute readily for the more conventional well known strip fasteners molded into seat buns for attachment of trim covers to form a completed seat assembly. To create special shapes of fastener, desirable for more intricate designs in the seat I cut the wide sheet into various shapes, such as curves, chevrons, wings and the like, using methods well known such as rotary or steel rule dies.

BRIEF DESCRIPTION OF THE DRAWINGS

In order to more fully understand the invention, reference is made to the following detailed drawings.

FIG. 7a is a cross sectional view of a molded plastic part, similar to that of FIG. 7, made with the back-to-back hook component of FIGS. 1a and 2a.

DESCRIPTION OF THE PREFERRED EMBODIMENTS

Figure 1:
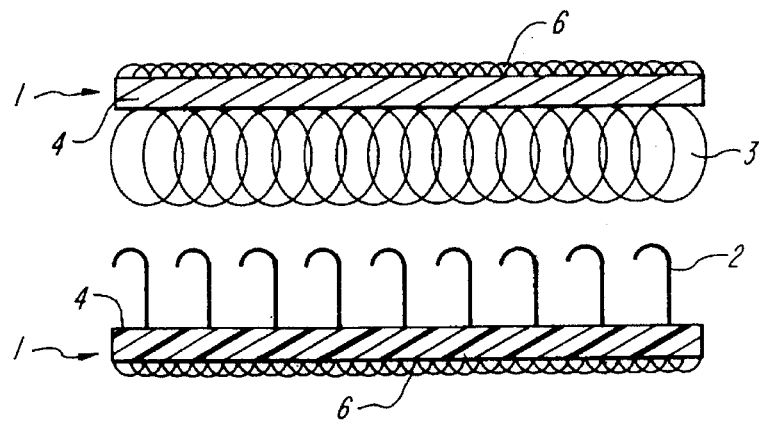
FIG. 1 is a cross sectional view of hook and loop components of a hook and loop fastener.
Figure 1A:
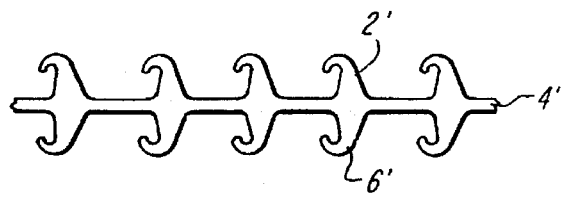
FIG. 1a is a cross sectional view of a back-to-back hook component of a hook and loop fastener.

FIG. 1 is a cross-sectional view of the two portions of a standard hook and loop tape 1 where the two portions are not engaged. Base 4 supports upstanding hooks 2 and loops 3. As the two portions are pressed together the hooks 2 penetrate loops 3 to releasably engage each side of the fastener. Backing 6 has been added to base 4 to serve as a tie layer for molding the fastener 1 into other objects such as plastic parts or elastomeric seat buns. Alternatively, as shown in FIG. 1a, a back-to-back hook portion has fastening hooks 2' which are used to fasten the hook portion to the loop portion; tie-down hooks 6' which are used to anchor the fastener into the molded plastic part; and base 4', all of which are integrally molded. Loops 3 and hooks 2 are customarily made from thermoplastic polymeric resins which are heat set to resiliently retain their shape during multiple openings and closings of the fastener. If the thermoplastic hooks or loops are subjected to high temperatures and/or high pressures the elements 2 or 3 will be crushed and rendered inoperable. If the temperature is raised near the softening point of the thermoplastic resin forming the fastener elements, the elements will distort or even melt if the temperature is sufficiently high. If at the same time great pressure is applied to the softened elements the entire assembly is crushed and the function of the fastener is destroyed.

A typical environment wherein such temperatures and pressures are encountered is in plastic molding such as injection molding, compression molding, casting, slush molding, powder molding, transfer molding, rotational molding and the like. Heretofore, it is not known to mold-in hook and loop fasteners directly into plastic parts using such methods because the molding process destroys the fastener elements.

Figure 2:
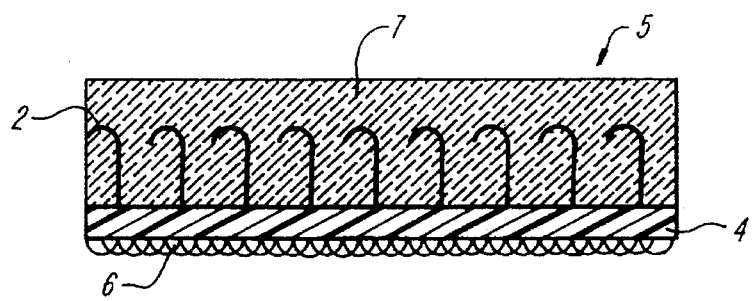
FIG. 2 is a cross sectional view of the hook component of FIG. 1 with the hooks encased in a protective encasement according to the present invention.
Figure 2A:
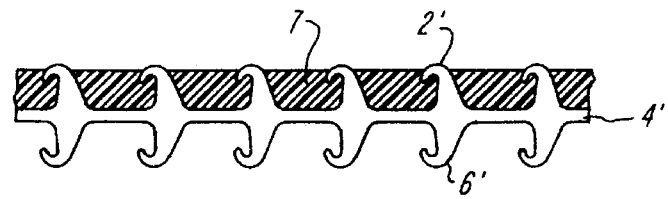
FIG. 2a is a cross sectional view of the back-to-back hook component of FIG. 1a with the fastening hooks encased in a protective encasement.

FIG. 2 depicts a cross sectional view of the product of this invention wherein the above mentioned difficulties have been overcome by encasing the fastener elements 2 in an elastomeric encasement 7 which completely surrounds the elements 2. Similarly, FIG. 2a depicts a back-to-back hook portion wherein the fastening hooks 2' are encased in elastomeric encasement 7, while tie-down hooks 6' are left exposed to facilitate anchoring the hook portion into a molded plastic part. The elastomeric protection encasing the elements 2 or 2' can be selected from a wide variety of materials which operate to encapsulate and prevent contamination or destruction of the hook or loop projections during a rigorous plastic molding operation, while at the same time affording an encasement that can be easily applied and removed from the projections without damage to their ultimate function as a separable fastener assembly.

Accordingly, elastomers are selected which have an initial application viscosity that facilitates the diffusion and penetration of the elastomer resin into the tiny irregularities of a hook and loop fastener. Both solvent cast and two-component curing elastomer systems are broadly contemplated, wherein the application viscosity of the former can be conveniently adjusted by controlling the weight percent of solid elastomer contained within a particular solvent system. In an embodiment using a two-component curing elastomer system, the individual liquid component viscosity becomes an important consideration for selecting the particular reactive combination. Accordingly, the uncured liquid components must combine to provide an application viscosity that first penetrates and encapsulate a fastener element, prior to eventual curing and formation of a solid encapsulating elastomeric medium.

Still a further criterion for selecting the elastomers of the instant invention is to include those elastomers that are effective to keep molten or liquid plastic out of the fastener elements during a particular molding cycle yet do not become permanently bound to the surface of the hooks or loops such that their removal destroys the fastener assembly. In connection with this objective, elastomers are selected which are relatively unable to adhere permanently to the surface of the particular fastener elements which they are encapsulating. It will also be appreciated that various additives can be combined with a particular elastomer to minimize permanent bonding of the surface of the fastener with a particular encapsulating material. Alternatively, the surface of the particular fastener may be treated with a release agent, prior to being coated with an elastomer resin, which facilitates removal of the elastomer after the plastic molding cycle is complete. Furthermore, additives may be incorporated directly into the various materials employed to produce the fasteners themselves, which would also contribute to a reduction in the bonding between the fastener surface and the encapsulating resin.

In addition to bonding performance, it is important to consider the structural characteristics of the elastomer as well. The elastomer must be soft or pliable enough (as indicated by Shore A durometer value or flex modulus) so as to be peeled away from the fastener. At the same time, it must possess sufficient tensile strength such that it does not break when being pulled away from the fastener.

Elastomers that are particularly suited to satisfy the above requirements include silicone rubbers, but other suitable materials include, when properly compounded, natural rubber, urethane rubbers, or other elastomers well known in the trade. When properly applied onto a hook and loop fastener 1 the elastomer encases the elements 2 (or 3) around all sides and effectively holds the element 2 in place with respect to its base 4 and adjacent hooks 2. The encapsulating elastomer 7 acts as both a seal to keep molten or liquid plastic out of the hooks 2 or loops 3 during the molding cycle, and as a compression stay to cushion the hooks from the extreme pressures associated with plastic molding cycles, and as an insulation barrier from any heat distortion or melting.

Figure 3:
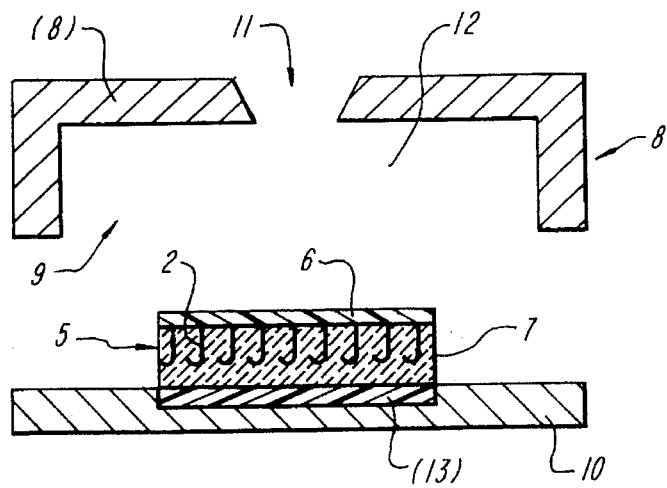
FIG. 3 is a cross sectional view depicting the fastener component of FIG. 2 positioned in an injection mold with the mold faces apart.
Figure 4:
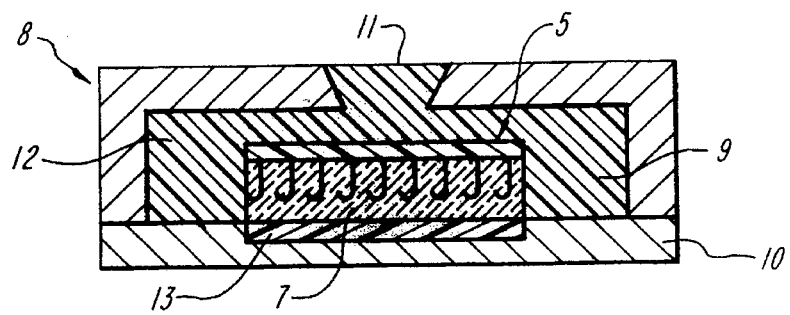
FIG. 4 is cross sectional view of the mold of FIG. 3 with the mold closed and having received molten plastic.
Figure 5:
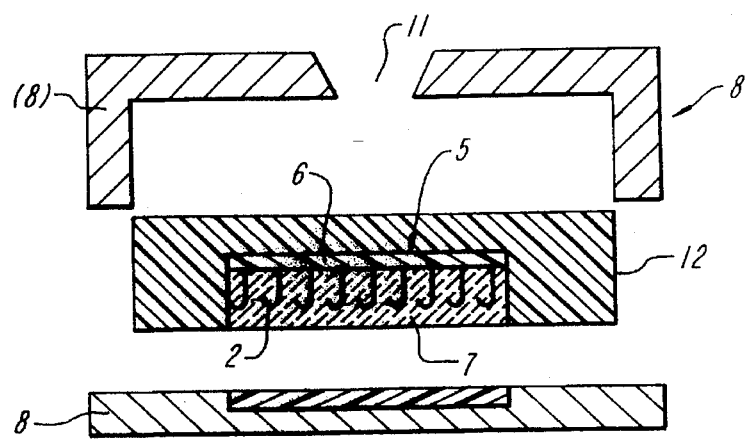
FIG. 5 is a cross sectional view of the mold of FIGS. 3 and 4 with the mold reopened and ready to discharge a molded plastic part having the fastener component of FIG. 2 molded therein.
Figure 6:
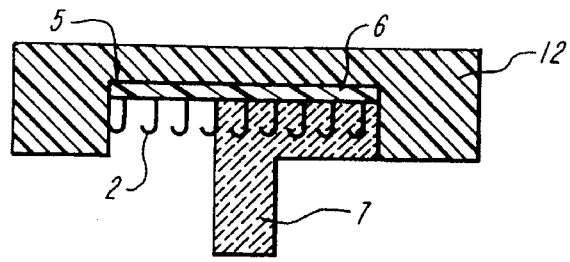
FIG. 6 is a cross sectional view of the molded plastic part of FIG. 5 demonstrating removal of the elastomeric encasement from the hooks of the fastener component.
Figure 7:
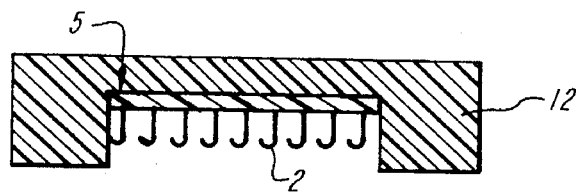
FIG. 7 is a cross sectional view of the molded plastic part of FIG. 6 after the elastomeric encasement has been completely removed.
Figure 7A:
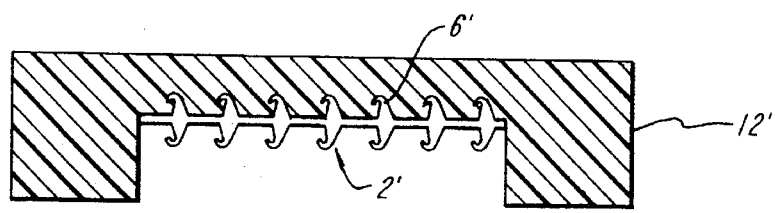

FIG. 3 is a cross section view of a simple injection mold 8 showing cavity plate 9 and core plate 10 in the open position. Fastener 5 is inserted into a section of the core plate and held thereon by a magnet 13 which is made an integral part of the mold 8. To assure attraction between the magnet 13 and the fastener 5, elastomeric encasement 7 contains, in addition to the elastomeric compound, iron particles that will be attracted to the magnet 13 and hold the fastener 5 in the desired location. FIG. 4 is a cross section representation of the mold 8 in the closed position where plastic has been injected into the cavity 9 through opening 11 to create the impression 12. FIG. 5 shows the next step in the molding process wherein the mold 8 is opened after the injected plastic has had time to solidify. At this point the part would be ejected from the mold 8. FIG. 6 depicts the step of removing the elastomeric protector 7 from the plastic part 12 to uncover fastening elements 2 or 3. FIG. 7 illustrates a cross section of the final piece 12 with hooks 2 aligned to receive loops from a companion piece (not shown) to detachably connect the assembly. Similarly, FIG. 7a illustrates a cross section of a final piece 12' made using a back-to-back hook component as shown in FIGS. 1a and 2a. The fastening elements are unaffected by the severe environment within the mold cavity and are in condition to perform their fastening function when joined together with the companion loop elements.

Figure 8:
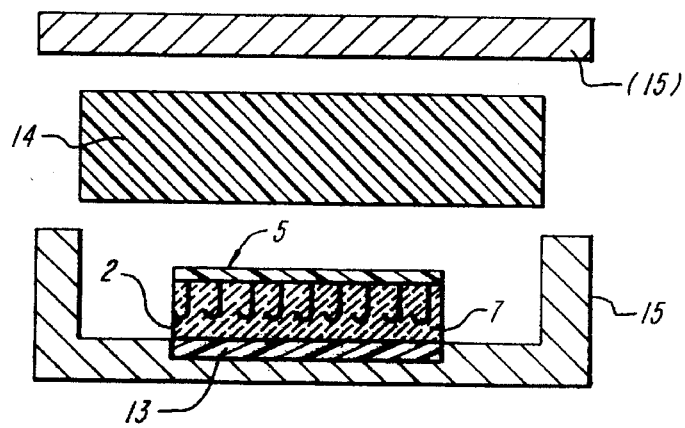
FIGS. 8–10 depict the same sequence as FIGS. 3–5, but for a compression molding process instead of an injection molding process.
Figure 9:
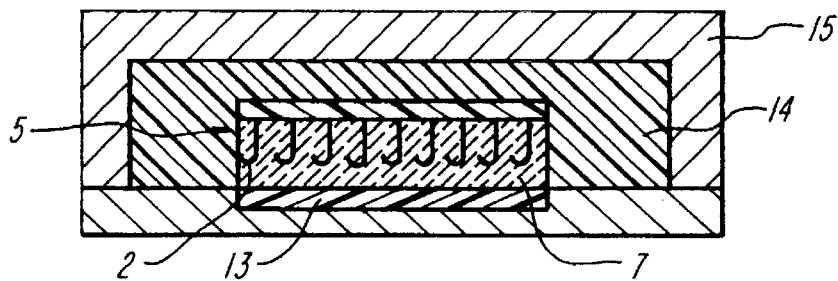
Figure 10:
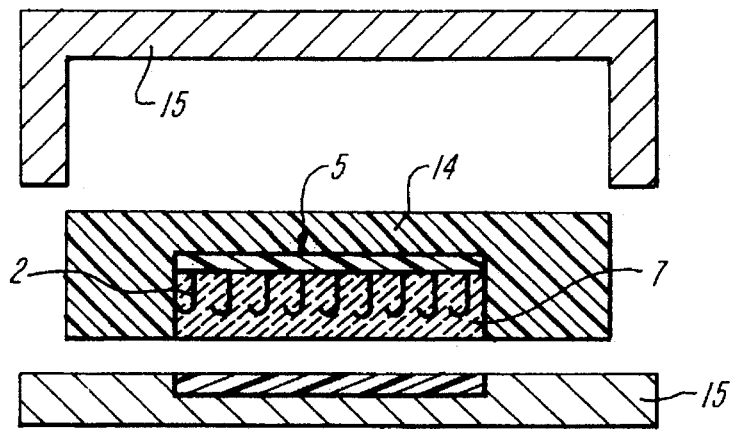

FIGS. 8–10 depict the molding sequence involved in the compression molding process using the fastener of this invention. In FIG. 8, the protected fastener 5 has been attached to the mold 15 by magnet 13. A polymer slug 14 is charged to the mold 15 and the upper portion of the mold 16 closes against the slug 14 causing it to melt and flow into the unoccupied portions of the mold cavity. FIG. 10 illustrates the next step in the compression molding process whereby the mold 15 is opened exposing the piece 12 which is subsequently removed from the mold 15. The finished piece contains the fastener 5, with the elastomeric protector 7 still in place, integrally contained as a part of the finished molded piece 12. The elastomeric protector 7 is removed as shown in FIG. 6 and the part 12 is represented, as in the case of injection molding, by FIG. 7.

Figure 11:
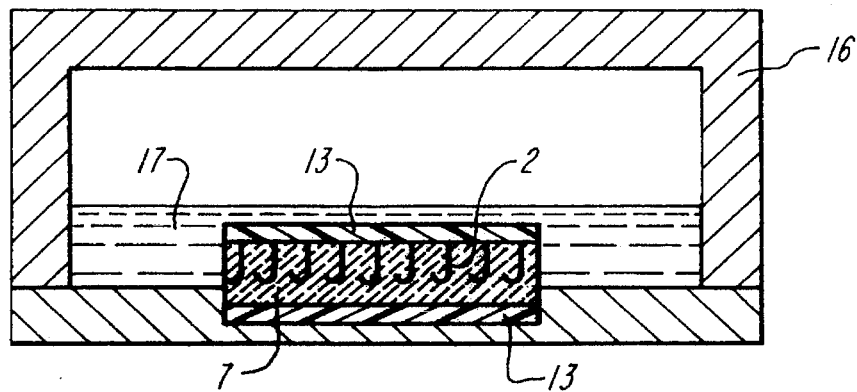
FIGS. 11–13 depict a fastener according to the invention being employed in a liquid plastic molding process wherein reactive chemical are poured into the mold and react to form a solid foam object, e.g., foam seat buns for automobiles.
Figure 12:
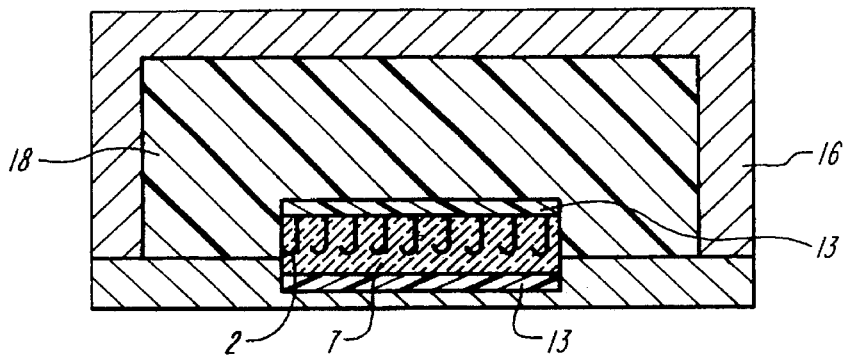
Figure 13:
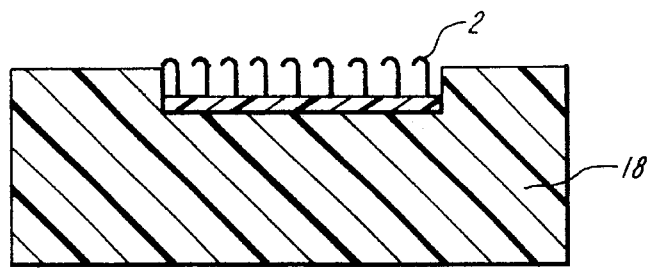

FIG. 11 illustrates the use of the invention in a liquid molding process, such as is used for the manufacture of elastomeric seat buns for automobiles, wherein the plastic piece 18 (see FIG. 13) is formed by pouring reactive chemicals 17, such as polyol and diisocyanate, into a mold 16 and permitting the parts to react to form a solid foam object 18. Mold 16 is charged with an appropriate chemical mixture 17, well known in the art, covering a fastener element 1 possessing a protective encasement 7. The fastener is held in the mold by magnetic attraction of a magnet 13 imbedded in the mold 16 upon iron particles incorporated into the protective encasement, as described above. FIG. 12 shows the mold 16 after the chemicals 17 have reacted and filled the mold 16 to form the plastic part 18. FIG. 13 shows the finished part 18, for example a seat bun, with the fastener 1 positioned in place and integrally molded therein, after the protective encasement 7 has been removed. It will be understood by those skilled in the art that in like manner any other method of forming plastic parts could be used to incorporate a hook and loop fastener into a solid flexible plastic part.

Figure 14:
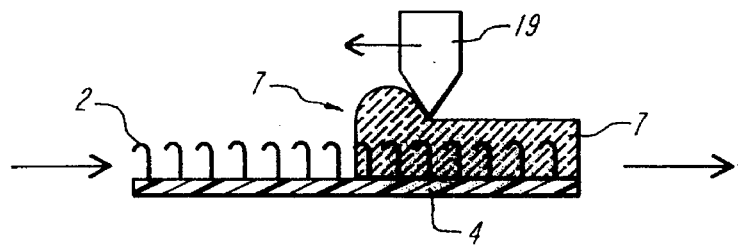
FIG. 14 depicts schematically a knife coating technique for applying the elastomeric encasement compound to the hooks of a fastener tape to produce a fastener component according to the invention.

It may be appreciated from the foregoing discussion that the essence of the invention is the provision of the elastomeric encasement around the engaging elements. Both the nature of the elastomeric compound and the method of its application are important considerations in creating this novel fastener. FIG. 14 illustrates a method of applying a liquid composition to the fastener elements of the instant invention. The fastener tape 1 is passed under the knife of a knife coater 19, well known in the art. The elastomeric compound 5 is evenly spread over and throughout the fastener elements 2. A compound composed of Silastic E, a two part room temperature vulcanizing silicone mixture sold by the Dow Corning Company, is ideally suited for application in this manner. After applying the liquid compound it is dried in an oven at 150 F. for 30 minutes. The fastener thus treated has a rubbery material completely encapsulating the fastening elements. A sheet of the encasement has a tensile strength of 700 psi and an elongation of 400%. In general, the elastomeric encasement should have a tensile strength of at least 200 pounds per square inch, and an elongation of at least 100%.

Figure 15:
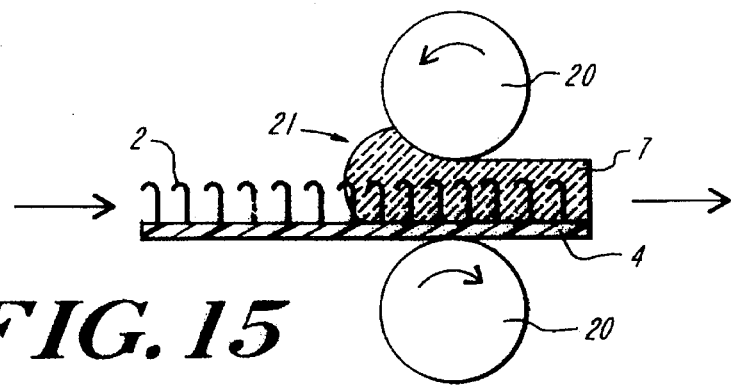
FIG. 15 depicts schematically an alternative, calendering technique for applying the elastomeric encasement compound to the hooks of a fastener tape to produce a fastener component according to the invention.

FIG. 15 illustrates a second method of applying an elastomeric encasement to the fastener material to create the product of this invention. Calender coating is well known in the art and I have found it useful for the purposes of coating hook and loop materials. The uncoated fastener 1 is passed between calender rolls 20. An elastomeric compound 7 is applied into the nip 21 formed between the rolls 20. The elastomeric compound is evenly distributed throughout the engaging elements 2. The combination thus formed is cured in a manner dictated by the particular elastomeric compound used.

Other materials which are also well suited to this method of application include Conap Conathane (TU4011), a two part urethane mixture, and vinyl plastisol sold by Coating Systems, Inc. (CS8-1303A). To each of these materials may be added 25% by weight of Bayflex 316 iron oxide powder as the ferromagnetic material which is attracted to the mold wall magnet.

Figure 16:
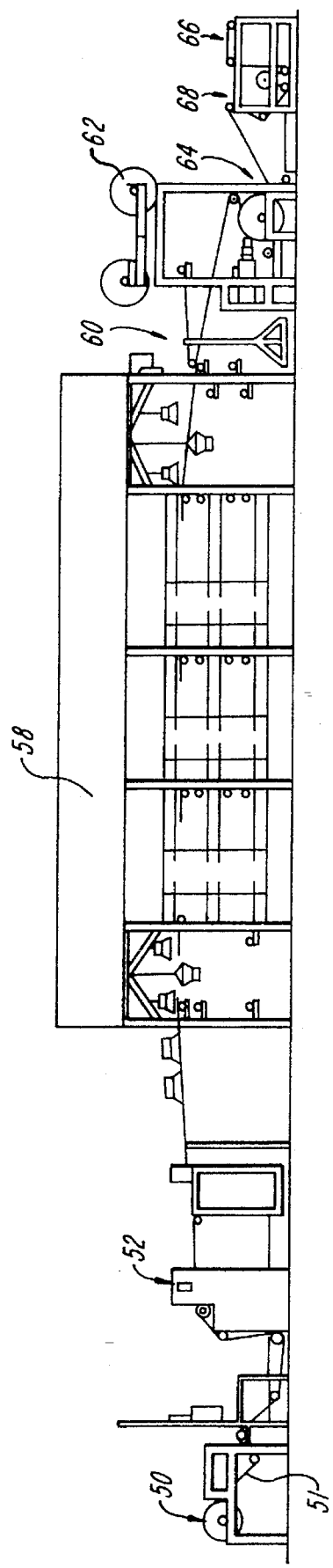
FIG. 16 is a schematic diagram showing an assembly line for producing a fastener component, as in FIG. 2, having a vinyl plastisol hook encasement.

Vinyl plastisol has been found to be particularly well suited for use in the present invention and is therefore a preferred material from which to form the encasement. A method for producing a mold-in fastener component with vinyl plastisol will now be described with reference to FIG. 16. First, a fiberglass/silicone release blanket 51 is loaded onto unwind stand 50 in roll form and threaded through the processing apparatus. From unwind stand 50, release blanket 51 passes to coating station 52.

Figure 17:
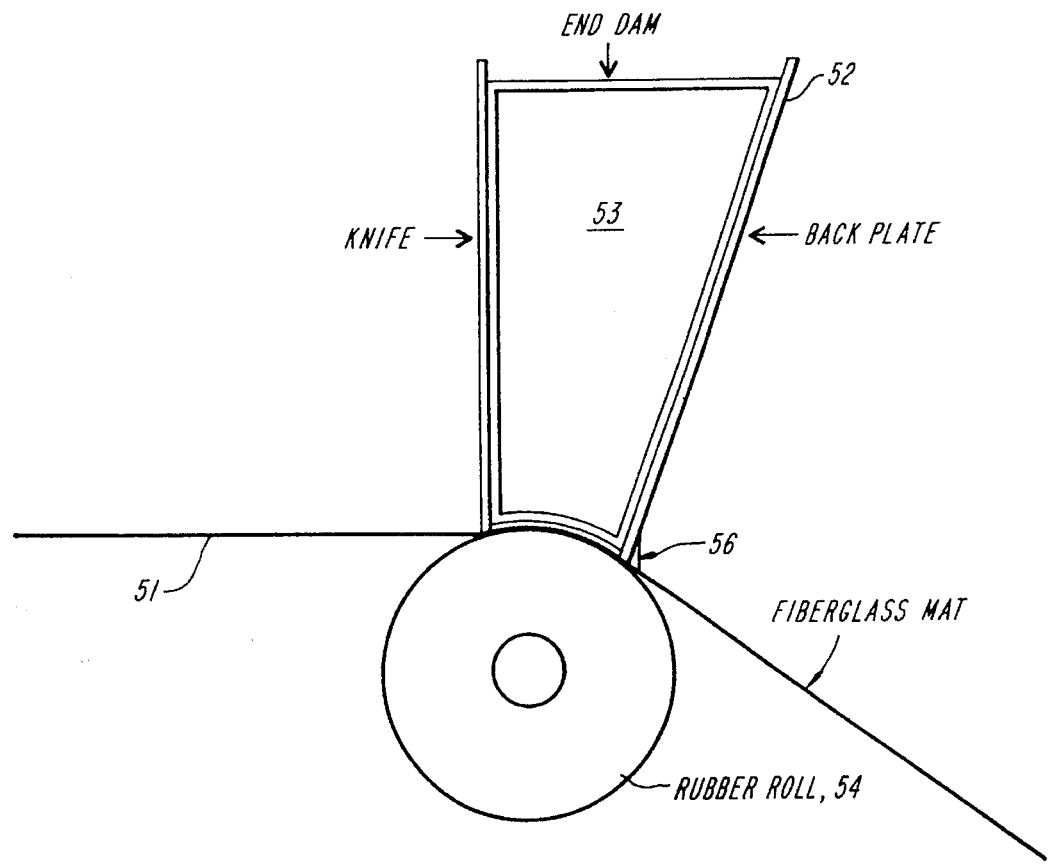
FIG. 17 is a schematic, side elevational view of a knife over roll coater used in the assembly line of FIG. 16.

Coating station 52 is essentially a knife over roll coater, as shown in greater detail in FIG. 17. Trough 53 is located above rubber roll 54, and release blanket 51 passes between them. As release blanket 51 passes under trough 53, vinyl plastisol at room temperature is dispensed from trough 53 onto release blanket 51. Magnetite ($Fe_3O_4$)—for magnetic attraction to the mold wall magnet—is also mixed into the plastisol. As the vinyl plastisol is applied to the release blanket 51, it is metered to a specific thickness by metering knife 56 which is attached to trough 53.

From coating station 52, release blanket 51 with the vinyl plastisol material enters heated oven zone 58. Oven zone 58 consists of a series of infrared lamps and forced hot-air convection ovens which heat the vinyl plastisol to the fusion temperature, which is approximately 375° F. Once the vinyl plastisol is fused, a series of infrared lamps activate a blowing agent contained in the vinyl plastisol material. A typical blowing agent is azodicarbonamide, available from the Uniroyal Chemical Company under the trade name Celogen AZ™. When the blowing agent reaches its activation temperature, it releases nitrogen gas which causes the vinyl plastisol to foam, a condition which is preferred. After foaming has taken place, release blanket 51 and the foamed vinyl plastisol exit oven zone 58.

From oven zone 58, vinyl plastisol-carrying release blanket 51 passes to nipping station 60 where engaging elements—on a tape of fastener engaging elements fed from unwind station 62—are nipped into the vinyl plastisol while the vinyl plastisol is still soft. The engaging elements are preferably hooks. The distance from oven zone 58 to nipping station 60 is a critical process parameter. When the vinyl plastisol material on release blanket 51 exits oven zone 58, it is in the fused and blown state, but it is still a soft material. If the hooks are nipped into the vinyl plastisol material too early, the vinyl plastisol will be so soft that, once it "cures," it will bond to the hooks so firmly as to prevent easy removal of the encasement. If nipping station 60 is too far away from oven zone 58, the vinyl plastisol will have cooled and hardened to such a degree that the hooks can not be nipped into the vinyl plastisol material efficiently, i.e., they will not readily penetrate the vinyl plastisol with the proper degree of encasement.

Once the vinyl plastisol, release blanket 51, and hooks are nipped together at nipping station 60, they continue through a series of rolls while the vinyl plastisol cools. At point 64, release blanket 51 is separated from the vinyl plastisol-encased hooks and is rewound at location 66. It is crucial for the vinyl plastisol to have cooled sufficiently such that, once it is separated from release blanket 51, it does not stick to anything, especially as the vinyl plastisol-encased hooks are rewound at location 68. Cooling need not be entirely completed, however, before the encased hooks are rewound; final "curing" is in situ, i.e., with the hooks embedded, as the rolled up material continues to cool to room temperature.

When fully "cured," the vinyl plastisol must have sufficient tensile strength such that, after the fastener has been molded into a part, the vinyl plastisol does not break as it is peeled off of the hooks. This consideration must be balanced against the need to have favorable release properties. Ideally, the lowest possible pull off force would be coupled with the highest tensile strength. Softness and rigidity of the vinyl plastisol should be considered, as the softer the vinyl plastisol is, the more easily it will deform around and release the hooks. Tensile strength should be at least 200 psi. Softness as measured on the Shore A durometer scale should be less than 90, and a value less than 70 is preferred.

Figure 18A:
FIG. 18a is a close up view of a hook protruding slightly through the encasement, as shown in FIG. 18.
Figure 18:
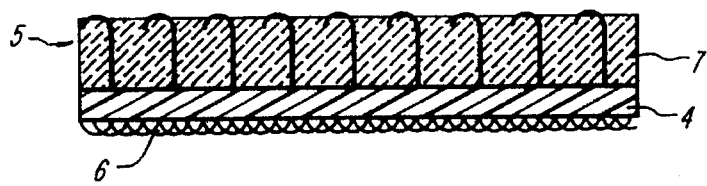
FIG. 18 is a cross sectional view showing hook elements protruding slightly through the elastomeric encasement according to another aspect of the invention.

In its just-foamed state, the vinyl plastisol layer should be just slightly thicker than the height of the hooks, as measured from the base member to the top of the hooks. For example, where the hooks are 0.13 inches high, a foam layer 0.14 inches high is appropriate. As nipping the hooks into the vinyl plastisol is done under pressure, some of the foam is collapsed such that a small portion of the hooks, e.g., the very top surfaces, pushes its way through the vinyl plastisol layer, creating an array of "pinholes" in the top of the vinyl plastisol layer, as shown in FIGS. 18 and 18a. It has been found that these "pinholes" make removal of the encasement easier, as it is believed that they prevent a suction force from forming as the hooks are pulled out of the encasement. Ease of removal and removal without breaking are important features of the present invention, as such qualities prevent manufacturing slowdown when a fastener according to this aspect of the invention is used in an assembly line environment.

Although the hooks could be protected using either foamed or solid material, using foamed vinyl plastisol has been found to be advantageous for a number of reasons, the first of which is cost. By using a foamed material, expensive solid material is "replaced" with nitrogen gas. Second, foamed material protects the hook from the pressure generated during an injection or compression plastic molding process. In effect, the foam acts as a compression stop around the hooks. When pressure from the plastic material is applied against the back of the fastener product, the foamed vinyl plastisol material will deform and flatten slightly, eventually reaching a point where it protects the hooks from being deformed or crushed by the pressure of the molding process.

The foamed material is a closed cell foam, such that nitrogen bubbles are encapsulated within the vinyl plastisol material. This further enhances the ease which the encasement is removed from the hooks as bubbles of gas—as opposed to vinyl plastisol—contact the surface of the plastic hooks in many places.

As noted above, the vinyl plastisol protective encasement has magnetite dispersed throughout. The magnetite will be attracted to a magnet, such as a rare earth magnet, that is bonded into a trench in the wall of a plastic-shaping mold. An appropriately cut and shaped piece of mold-in fastener product, as made according to the above described process, is placed into the mold with the elastomeric encasement facing the magnets and the mold wall. Plastic material is then introduced under pressure according to any of the plastic molding techniques described above.

As noted previously, the elastomer protects the hooks from the compressive force of the molding process. In an injection molding process, the pressure may range from 500 to 2000 pounds per square inch exerted against the hook fastener, depending on the particular material being molded and the molding process itself. In compression molding—a process wherein a preheated and softened plastic slug is forced to flow under pressure into all niches of the mold—the pressure exerted against the hook fastener may range from 1000 to 2000 psi.

When the plastic molding process is complete, the mold is opened and the molded plastic part is removed from the tool. At that point, the vinyl plastisol elastomeric encasement is stripped from the hooks. As noted above, the softness of the vinyl plastisol material and the fact that it has been foamed increase the ease with which it may be stripped from the hooks, as compared to the "strippability" of a harder of more rigid encasement material. Furthermore, it is important that the hooks not be permanently deformed as the vinyl plastisol encasement is removed, as that would destroy their fastening capability. The softness, flexibility, and foamed state of the vinyl plastisol further this objective as well.

Figure 19:
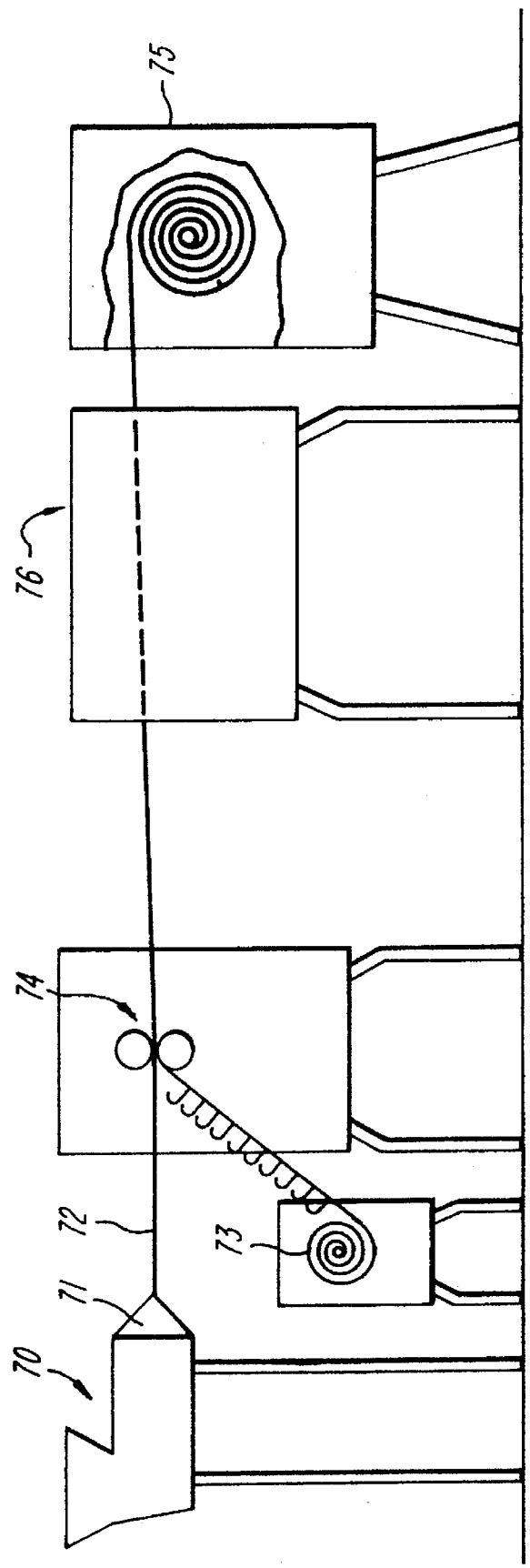
FIGS. 19 and 20 are schematic diagrams depicting alternative assembly lines for producing a fastener component, as in FIG. 2, having an extruded thermoplastic hook encasement.

In another preferred manufacturing technique, a thermoplastic material is used for the encasement and is extruded onto the hooks. As shown in FIG. 19, the technique entails processing a thermoplastic material in an extruder 70, passing it through a slot-form extruder die 71 to form a molten plastic sheet 72 which is used to form the encasement for the hooks. A tape of hooks is unwound from unwind station 73 and the hooks are embedded into the still-soft thermoplastic sheet 72 by nip rolls 74. As in the method described above for providing a vinyl plastisol encasement, when the engaging elements are nipped into the thermoplastic sheetform web, the thermoplastic should be soft enough to permit efficient nipping, yet cool enough to prevent excessive bonding of the thermoplastic to the engaging elements. The composite hook/encasement structure is taken up at wind-up station 75, after having been cooled at 76 between nip rolls 74 and wind-up station 75.

Cooling can simply be by a combination of radiation and convection under ambient conditions, but preferably, in most instances, a cooling device is employed for this purpose. The composite structure is immersed or passed through a cooling trough filled with water, or passed through a plenum having cooled air or over a sequence of chilled rolls. Alternatively, cooling can be effected by cooling nip rolls 74 by flow of a cooling medium through their interiors.

The thermoplastic can consist of any of a variety of materials, selected to ensure sufficient flexibility and cohesiveness to enable stripping from the hooks without causing damage to the hooks or the base sheet to which they are attached or creating risk that the plastic strip may rupture under pull-off stress. Depending upon the size and distribution of the hooks, the thermoplastic can be a flexible PVC extrusion compound, a thermoplastic elastomer or other flexible thermoplastic compounds. The extruded thermoplastic material can be solid or foamed, depending on the particular application of the final product. As described above with respect to a vinyl plastisol encasement, a foamed encasement yields a cost advantage and can be easier to remove. An additional advantage of using a thermoplastic material is the fact that the encasement may be recycled after it has been stripped from the hooks.

For certain extruded materials and conditions, the melt strength of the extruded sheet may be so low as to cause sagging of the web if the extruder is disposed horizontally. In such cases, the thermoplastic can be extruded from a vertical extruder into an upwardly facing nip to avoid sagging of the web.

Figure 20:
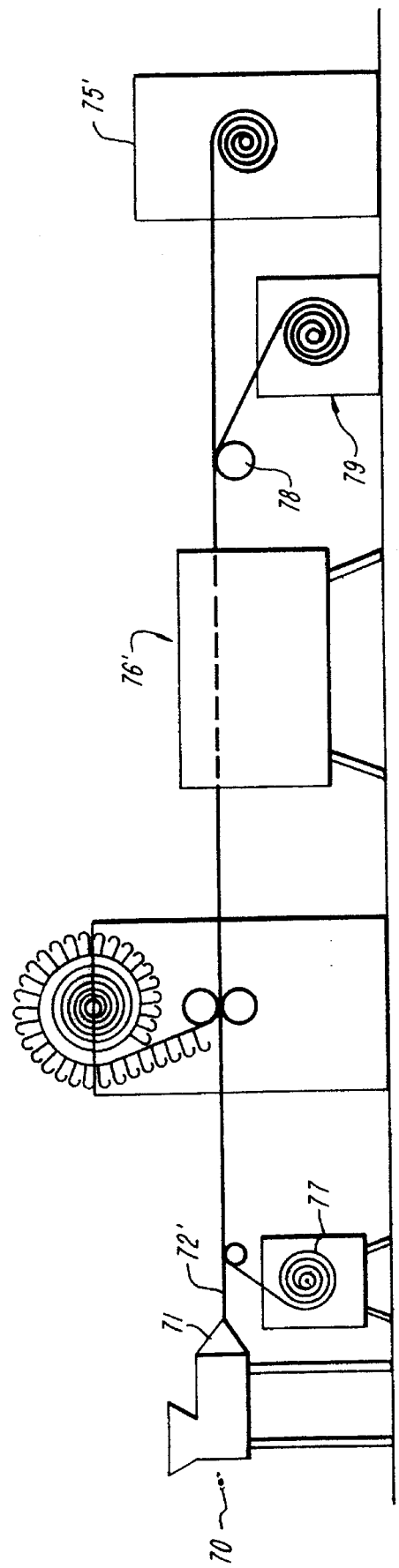

An alternate method, shown in FIG. 20, employs a release blanket 77. Extruder 70' and extruder die 71' produce thermoplastic web 72', which is carried by release blanket 77. Hooks of hook tape 73' are embedded into the upper surface of the extrudate being carried by release blanket 77, and the composite assembly enters the nip formed by rolls 74'. The composite assembly then passes through a cooling device 76', such as described above. From there, it passes to separating roll 78, at which point the release blanket is stripped from the encased hooks and each is taken up separately, take-up station 75' being provided for the encased hook tape and take up station 79 being provided for the release blanket.

As in the case of a vinyl plastisol encasement, criteria for selecting the particular thermoplastic material include high flexibility and low bond strength, so as to permit easy removal of the encasement. Other criteria include the melting or softening point of the thermoplastic material, which usually is desired to be higher than the temperature to which the encased hooks are exposed during the molding process, as well as the tensile strength of the material as noted previously.

In the methods described above, the hooks may be of molded form, including mushroom-shaped, or they may be textile monofilament cut hooks. Furthermore, as noted above, magnetizable matter, e.g. magnetite, can be incorporated into the encasement. This is particularly preferable where the hooks are part of a back-to-back configuration as shown in FIGS. 1a and 2a. Substances such as iron powder, iron filings, other iron oxides such as $Fe_2O_3$, other iron compounds, or compounds of other elements which are magnetizable can be used.

The magnetically attractable substance is advantageously used as a meaningful colorant. For example, iron oxide is available as a pigment in several colors, such as black, red, and yellow. According to another aspect of the invention, different colored oxides are selected for use with respectively different hook products to identify different sized or shaped fastener mold-ins. Furthermore, by choice of the magnetizable substance providing an encasement of a different color than the hooks enables one to tell quite easily, simply by looking, whether or not the encasement has been removed from the hooks.

Figure 21:
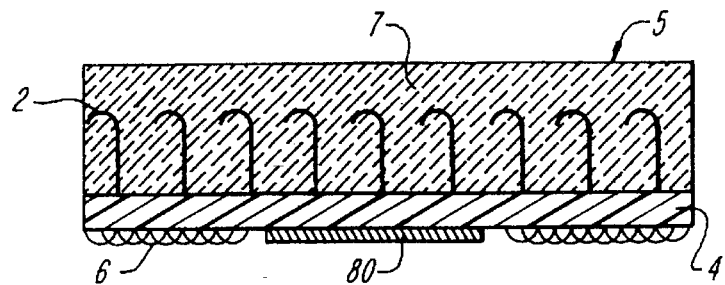
FIGS. 21–23 are cross sectional views showing various embodiments of a hook fastener according to the invention, with a steel shim used for positioning the fastener within a mold.
Figure 22:
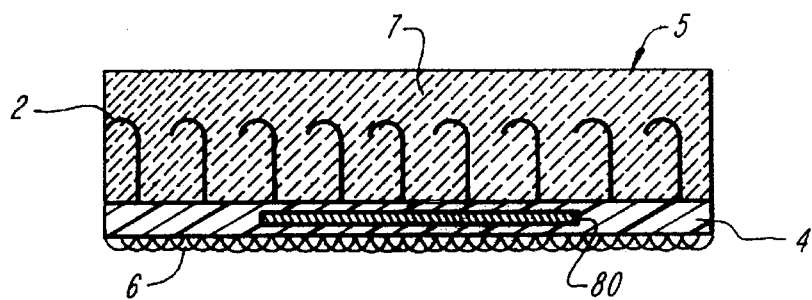
Figure 23:
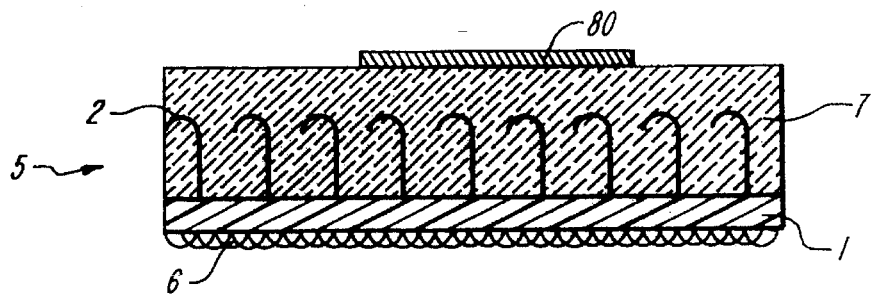

While in certain preferred embodiments the magnetizable material is dispersed in the material of the encasement, in other circumstances it is preferred to provide it using conventional techniques. A steel shim 80 may be attached to the back of the hook base member 4, as shown in FIG. 21, or embedded within the base member 4 as shown in FIG. 22. Alternatively, steel shim 80 may be attached to encasement 7, as shown in FIG. 23. The ferromagnetic substance represents at least 1% of the weight of the covering and preferably between 15% and 25%, inclusive, of the weight of the covering.

Reference has been made above to the fastener product being die-cut into various shapes. The ability to die-cut the product is obtained, for example, by extruding a wide hook web of, e.g., twelve inches width or more, and providing a correspondingly wide encasement. Complex, curved, or very wide shapes can then be die-cut from such a product.

Uses or applications for this product include attaching automotive upholstery, where a hook assembly is molded into a polyurethane foam seat cushion and then used to attach the fabric or upholstery covering to the cushion. The potential uses, however, are far broader. A fastener product according to the invention can be used in virtually any application where it is desired to mold hooks into a plastic or rubber part to provide means for attaching another part to the plastic part.

Furthermore, although the invention has been described in reference to protecting hooks in an elastomeric encasement, in certain applications it may be desirable to apply the encasement to protect loops. The characteristics of the material being molded, as well as the characteristics of the loops themselves should be taken into account when determining the advisability of this approach.

EXAMPLES

The following examples will be illustrative of the execution of the method for manufacturing and use of the product of this invention.

Example I

A length of the plastic hook portion of a hook and loop closure designated as Ultra-mate HTH 708 is extruded as described in Fisher U.S. Pat. No. 4,794,028. The resultant poly(propylene) layer containing about 750 hooks/in$^2$ was coated in a laboratory coater using Dow Corning Silastic E two part room temperature vulcanizing (RTV) silicone mixed in a 10:1 ratio of part "A" with part "B" as recommended by the chemical manufacturer. 25% by weight of Mobay Bayferrox 316 was added to the silicone mixture. The knife of the coater was set to a gap of 0.010" above the top surface of the hooks of the fastener tape for applying a first coating to the tape. The knife gap was adjusted to 0.025" above the top surface of the hooks to render the second coating smooth and more evenly distributed throughout the hooks. The coated tape was placed in a convection oven at 140 F. for 30 minutes. After removing from the oven and permitting to cool it was observed the silicone encasement was easily removed from the hook elements with no noticeable distortion or diminution of their fastening ability. A sample, prepared as described, was cut into a section 1" by 1" and inserted into a recess of the same size cut to accommodate the fastener, in a plaque mold 1" by 4". A Zytel (nylon) injection grade plastic, sold by the Dupont Company, was injected into the mold at a nozzle temperature of 525 F. for 3 seconds at an injection pressure of 7000 psi with a hold time of 45 seconds. The plastic plaque thus formed was removed from the mold and the silicone encasement on the fastener was mechanically pulled from the piece to expose the hooks. No damage to the hook could be observed.

Example II

A length of the plastic hook portion of a hook and loop closure, designated as Ultra-mate HTH 708 poly(propylene), was coated in a laboratory coater using Dow Corning Silastic E, a two part room temperature vulcanizing (RTV) silicone mixed in a ratio of 10:1 as described above. 25% by weight of Mobay Bayferrox 316 iron oxide powder was added to the silicone mixture. Coating proceeded as in example I. A sample cut into a section 1" by 1", was inserted into a recess of the same size cut to accommodate the fastener, into a plaque mold 1" by 4". A poly(propylene) injection grade plastic, sold by the Dupont Company was injected into the mold at a nozzle temperature of 425 F. for 3 seconds at an injection pressure of 12,000 psi with a hold time of about 30 seconds. The plastic plaque thus formed was removed from the mold and the silicone encasement on the fastener was mechanically pulled from the piece to expose the hooks. No damage to the hooks could be observed.

Example III

A plastic hook was extruded as in Example I but the plastic was a polyester based elastomer, CFM Hytrel 8238, sold by the Dupont Company. Laminated on the surface opposite the hook elements was a rayon nonwoven fabric, Pellon 850, sold by the Freudenberg Company. The fastener element thus formed was calender coated using a proprietary EPDM (ethylene-propylene rubber) material supplied by JPS elastomers division of the JPS Corporation who also carried out the calendering step. The EPDM encasement with the fastener strip was 0.120 inches thick and 12 inches wide. Samples of the coated fastener were die cut into shaped pieces approximately 1" wide making a smooth curve with inner radius of 20 inches and a total length of approximately 8 inches. The part thus cut was placed in a clamshell mold used to make seat buns incorporating a pedestal containing a magnet on its upper surface to hold the piece with the elastomeric encasement facing downward and in intimate contact with the top surface of the pedestal. A standard charge of liquid chemicals, including a diisocyanate and a polyol, were introduced into the mold. The upper half of the mold was closed and the chemicals allowed to react to create a foam which filled the cavity of the mold. The mold was opened and seat bun removed. The EPDM elastomeric encasement of the hooks was removed by gripping one end of the elastomer and pulling the encasement from the fastener. The encasement pulled away from the hooks of the fastener without difficulty to expose the hooks. There was no noticeable tendency to pull the fastener from the soft urethane foam and the hooking elements were perfectly clear and free of any chemical. No damage or distortion of the hooks could be observed.

Example IV

A plastic hook (Velcro® hook #CFM 24-2014) was extruded as in Example I, but using Zytel FX4209, a nylon based resin, sold by the Dupont Company. Loop 3200, a polyester knitted loop fabric sold by Guilford, was laminated on the surface opposite the hook elements. The fastener element thus formed was transfer coated using a vinyl plastisol material filled with 15% by weight Bayferrox 318M magnetite, sold by Mobay. The plastisol material also contained a heat activated blowing agent which caused the vinyl plastisol to foam when heated. The entire custommade composition was supplied by Coating Systems, Inc. under the product number CSI 1341a.

The vinyl encasement with the fastener strip embedded therein was 0.120" thick by 13" wide. Samples of the coated fastener were die cut into shaped pieces, approximately 1" wide, having smooth curves and various inner radii and lengths. The pieces were placed in a clamshell mold, used to make seat buns, having a pedestal with a magnet on its upper surface to hold the piece with the vinyl encasement facing downward and in intimate contact with the top surface of the pedestal.

A standard charge of liquid chemicals, including a diisocyanate and polyol, was introduced into the mold. The upper half of the mold was closed and the chemicals were allowed to react to create a foam which filled the cavity of the mold. The mold was opened and the seat bun removed.

The vinyl encasement was removed from the hooks by gripping each end of a slit cut through the vinyl in the center of each part, and pulling the encasement from the fastener. The encasement pulled away from the hooks of the fastener, without difficulty, to expose the hooks. There was no noticeable tendency to pull the fastener from the soft urethane foam and the hooking elements were free of any chemical. No damage or distortion of the hooks could be observed.

Example V

A plastic hook (Velcro® hook #CFM 24-2014) was extruded as in Example I but using Zytel FX4209, a nylon based resin, sold by the DuPont Company. Loop 3200, a polyester knitted loop fabric sold by Guilford, was laminated on the surface opposite the hook elements. The fastener element thus formed was nipped onto an elastomeric, extruded polyvinyl chloride (PVC) material filled with 20% by weight Bayferrox 318M magnetite, sold by Mobay. The entire custom-made PVC composition was supplied by Teknor Apex under part number 93-A0090B-52. The PVC encasement with the fastener strip was 0.120" thick by 1" wide.

Samples of the coated fastener were die cut into 1" wide strips of various lengths. The cut pieces were placed in a clamshell mold, used to make seat buns, having a trench with a magnet on its lower surface to hold the piece with the encasement facing downward and in intimate contact with the bottom surface of the trench.

A standard charge of liquid chemicals, including diisocyanate and a polyol, was introduced into the mold. The upper half of the mold was closed and the chemicals were allowed to react to create a foam which filled the cavity of the mold. The mold was opened and the seat bun removed.

The PVC encasement of the hooks was removed by gripping each end of the elastomer and pulling the encasement from the fastener. The encasement pulled away from the hooks of the fastener, without difficulty, to expose the hooks. There was no noticeable tendency to pull the fastener from the soft urethane foam and the hooking elements were free of any chemical. No damage or distortion of the hooks could be observed.

What is claimed is:

1. A hook or loop component of a hook and loop fastener which can be integrally molded into a plastic article by a molding process, said hook or loop component comprising
    a fastener element comprising a base member and a plurality of engaging elements upstanding from a surface thereof,
    a removable, elastomeric protective encasement having said engaging elements embedded therein, said protective encasement at least partially intimately surrounding said engaging elements so as to protect said engaging elements during said molding process, and
    a magnetizable substance carried by said fastener element for enabling said hook or loop component to be held within a mold during said molding process by magnetic attraction to magnets in the mold,
    said protective encasement being removable from said engaging elements so as to expose said engaging elements without permanently deforming said engaging elements or substantially destroying fastening performance of said engaging elements.

2. The component of claim 1, said fastener element further comprising a plurality of anchoring elements protruding from a surface of said base member opposite from said engaging elements, said anchoring elements facilitating molding of said component into said plastic article.

3. The component of claim 2 wherein said engaging elements and said anchoring elements are integrally molded with said base member.

4. The component of claim 1 wherein said elastomeric encasement comprises cured plastisol.

5. The component of claim 1 wherein said elastomeric encasement comprises a thermoplastic material.

6. The component of claim 5 wherein said thermoplastic material is in a set state after being extruded from an extruder, having said engaging elements nipped into said thermoplastic material, and being cooled.

7. The component of claim 1 wherein said magnetizable substance comprises ferromagnetic particles disposed within the body of said protective encasement.

8. The component of claim 1 wherein said magnetizable substance comprises a metallic strip associated with said base member.

9. The component of claim 1 wherein said protective encasement partially encases said engaging elements such that top surfaces of said engaging elements are slightly exposed.

10. A hook or loop component of a hook and loop fastener which can be integrally molded into a plastic article by a molding process, said hook or loop component comprising
    a fastener element having a base member and a plurality of engaging elements upstanding from a surface thereof, and
    a removable, elastomeric protective encasement having said engaging elements embedded therein, said protective encasement partially encasing said engaging elements such that top surfaces of said engaging elements are slightly exposed,
    said protective encasement being removable from said engaging elements so as to expose said engaging elements without permanently deforming said engaging elements or substantially destroying fastening performance of said engaging elements.

11. The component of claim 10, said fastener element further comprising a plurality of anchoring elements protruding from a surface of said base member opposite from said engaging elements, said anchoring elements facilitating molding of said component into said plastic article.

12. The component of claim 11 wherein said engaging elements and said anchoring elements are integrally molded with said base member.

13. The component of claim 10 wherein said elastomeric encasement has a tensile strength of at least 200 pounds per square inch.

14. The component of claim 13 wherein said elastomeric encasement has a tensile strength on the order of 700 pounds per square inch.

15. The component of claim 10 wherein said elastomeric encasement has an elongation of at least 100%.

16. The component of claim 15 wherein said elastomeric encasement has an elongation on the order of 400%.

17. A fastener of the hook and loop type intended to be incorporated into plastic articles by plastic molding processes comprising a separable fastener member having a base member and a plurality of engaging elements upstanding from one surface thereof; means for covering and intimately surrounding and encasing said engaging elements, adapted to protect said elements when exposed to the harsh environment of a molding process, said means being removable from the fastener after the molding process to expose said engaging elements without substantially destroying the performance thereof, the means for covering and intimately surrounding and encasing the engaging elements including magnetizable means.

18. The fastener according to claim 17 wherein the magnetizable means is a ferromagnetic substance.

19. The fastener according to claim 18 wherein the ferromagnetic substance represents at least 1% of the weight of the covering.

20. The fastener according to claim 19 wherein the ferromagnetic substance represents between 15% and 25%, inclusive, of the weight of the covering.

21. A fastener of the hook and loop type intended to be incorporated into plastic articles by plastic molding processes comprising a separable fastener member having a base member and a plurality of engaging elements upstanding from one surface thereof, elastomeric protective means covering and at least partially surrounding and filling the space between said engaging elements, adapted to protect said elements when exposed to the harsh environment of a molding process, said protective means being adapted to be removed from the fastener after the molding process to expose said engaging elements without substantially destroying the performance of said elements, the elastomeric means for covering and at least partially surrounding the upstanding elements including magnetizable means.

22. The separable fastener of claim 21 wherein the elastomeric protective means which partially surrounds and fills the space between the engaging elements is an elastomeric composition which can be applied as a flowable composition and cured to an elastomer in place.

23. A fastener of the hook and loop type intended to be incorporated into plastic articles by plastic molding processes comprising a separable fastener member having a base member and a plurality of individual engaging elements upstanding from one surface thereof; means for partially encasing said individual engaging elements such that top surfaces of said engaging elements are slightly exposed, said means adapted to protect said elements when exposed to the harsh environment of a molding process, said means being removable from the fastener after the molding process to expose said engaging elements without substantially destroying the performance thereof, said means for partially encasing said engaging elements being an elastomeric composition which fills the volume surrounding the elements and can be cured to an elastomer, said elastomeric composition having incorporated therein a magnetic attractant.

24. The component of claim 23 wherein said elastomeric encasement is in a foamed condition.

25. A fastener of the hook and loop type intended to be incorporated into plastic articles by plastic molding processes comprising a separable fastener member having a base member and a plurality of individual engaging elements upstanding from one surface thereof; means for partially encasing said individual engaging elements such that top surfaces of said engaging elements are slightly exposed, said means adapted to protect said elements when exposed to the harsh environment of a molding process, said means being removable from the fastener after the molding process to expose said engaging elements without substantially destroying the performance thereof, said means for partially encasing the engaging elements including magnetizable means, said magnetizable means being a ferromagnetic substance.

26. The fastener according to claim 25 wherein the ferromagnetic substance represents at least 1% of the weight of the covering.

27. The fastener according to claim 26 wherein the ferromagnetic substance represents between 15% and 25%, inclusive, of the weight of the covering.

28. A fastener of the hook and loop type intended to be incorporated into plastic articles by plastic molding processes comprising a separable fastener member having a base member and a plurality of individual engaging elements upstanding from one surface thereof, elastomeric protective means partially covering and surrounding the engaging elements such that top surfaces of said engaging elements are slightly exposed, said protective means adapted to protect said elements when exposed to the harsh environment of a molding process, said protective means being adapted to be removed from the fastener after the molding process to expose said engaging elements without substantially destroying the performance of said elements, said elastomeric protective means for covering and at least partially surrounding the upstanding elements including magnetizable means.

29. A fastener of the hook and loop type intended to be incorporated into plastic articles by plastic molding processes comprising a separable fastener member having a base member and a plurality of individual engaging elements upstanding from one surface thereof, elastomeric protective means partially covering and surrounding the engaging elements and filling the space between said individual engaging elements such that top surfaces of said engaging elements are slightly exposed, said protective means adapted to protect said elements when exposed to the harsh environment of a molding process, said protective means being adapted to be removed from the fastener after the molding process to expose said engaging elements without substantially destroying the performance of said elements, said elastomeric protective means having incorporated therein a magnetic attractant.

30. The fastener according to claim 29 wherein the magnetic attractant is a ferromagnetic substance.

31. The fastener according to claim 30 wherein the ferromagnetic substance represents at least 1% of the weight of the elastomeric protective means.

32. The fastener according to claim 31 wherein the ferromagnetic substance represents between 15% and 25%, inclusive, of the weight of the covering.

* * * * *

UNITED STATES PATENT AND TRADEMARK OFFICE
CERTIFICATE OF CORRECTION

PATENT NO. : 5,540,970
DATED : July 30, 1996
INVENTOR(S) : Banfield et al.

It is certified that error appears in the above-indentified patent and that said Letters Patent is hereby corrected as shown below:

Cover page, related U.S. Application Data, block [63] lines 2 and 3 to switch "continuation-in-part" and "continuation" as well as to delete duplicate entry in lines 3 to 4 of "U.S.S.N. 695,183, May 3, 1991" to read:

"Continuation of Ser. No. 390,150, Feb. 21, 1995, abandoned, which is a continuation of Ser. No. 87,917, Jul. 6, 1993, abandoned, which is a continuation-in-part of Ser. No. 976,485, Nov. 16, 1992, abandoned, which is a continuation of Ser. No. 695,183, May 3, 1991, abandoned."

Signed and Sealed this

Twenty-fifth Day of March, 1997

*Attest:*

BRUCE LEHMAN

*Attesting Officer*     *Commissioner of Patents and Trademarks*